Patented Mar. 25, 1947

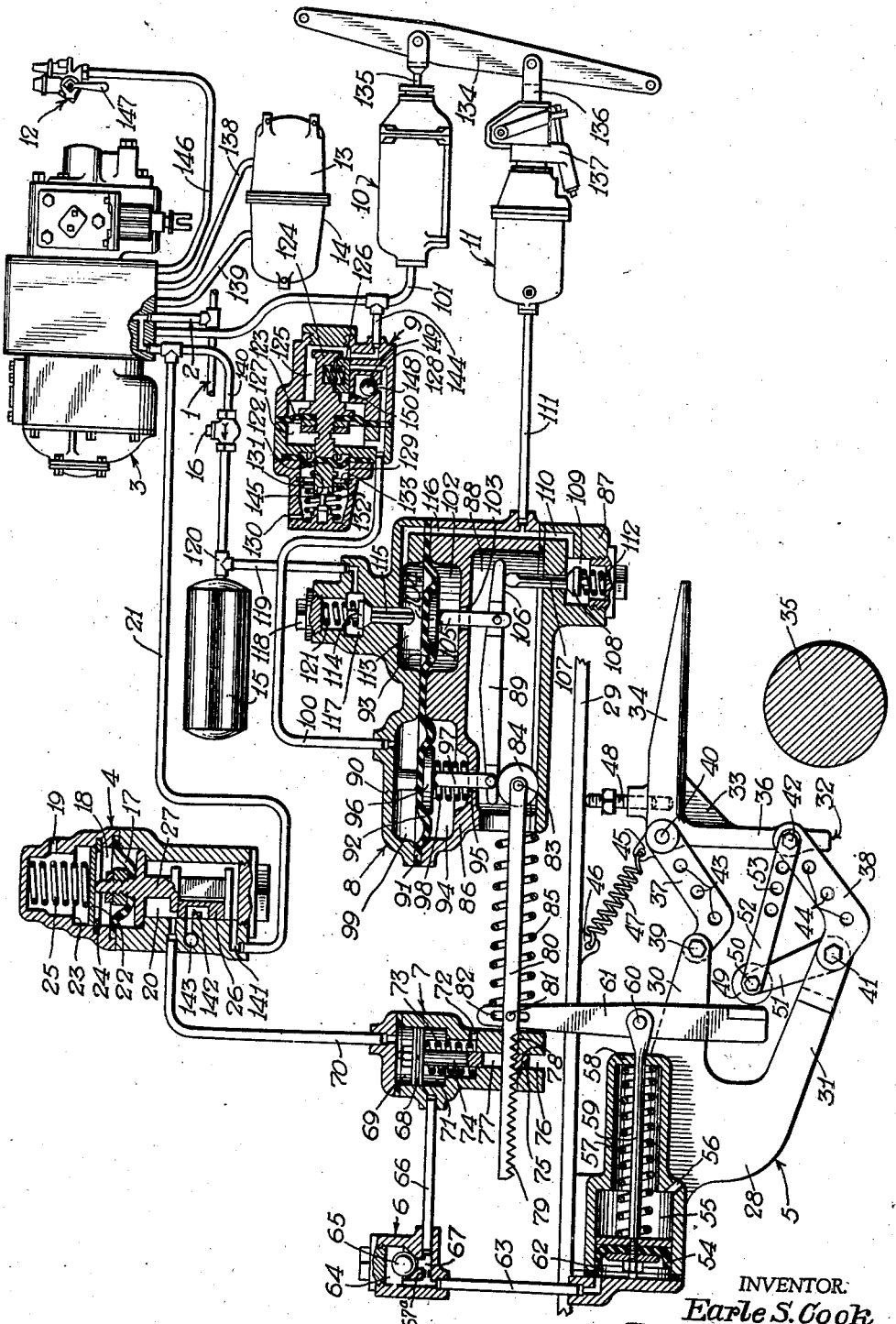

2,418,013

UNITED STATES PATENT OFFICE 2,418,013

VARIABLE LOAD BRAKE

Earle S. Cook, Wilkinsburg, Pa., assignor to The Westinghouse Air Brake Company, Wilmerding, Pa., a corporation of Pennsylvania Application July 26, 1944, Serial No. 546,650

25 Claims. (Cl. 303—22)

This invention relates to variable load brake equipment for vehicles, and more particularly to that type of equipment which is constructed and arranged to be automatically adjusted or conditioned to vary the braking force according to the position the vehicle body, under various loads, assumes relative to the fixed part of a truck.

The present trend toward the use of light weight materials in the construction of railway freight cars has resulted in much higher ratios of gross weight to tare weight than ever before encountered. Since the braking force in relation to the weight of an empty car must be such as to avoid wheel sliding and excessive train shock, the braking force on lighter weight cars will consequently have to be lower. Because the gross weight of the car is limited only by the load limit for the trucks, which remain unchanged, the lower braking force will quite often be inadequate for proper control of such cars when loaded.

The principal object of this invention, therefore, is to provide a variable load brake equipment which will operate in conjunction with the present type of fluid pressure freight brake equipment so that the braking force will be sufficiently low on an empty car to prevent wheel sliding and will be increased in relation to the gross weight of the car so that a loaded or partially loaded car may be properly controlled in a train. It has been ascertained by study that the gross weight of a great number of cars in service ranges between 60,000 and 80,000 pounds, and it is, therefore, an object of this invention to provide a variable load brake equipment which will obtain the maximum permissible braking force in relation to the gross weight of a car in the range of weights for the service in which the car will be most frequently used.

Another object is to provide a variable load brake equipment which will maintain substantially the proper ratio between the reduction in brake pipe pressure and the braking force obtained per pound reduction in brake pipe pressure.

Another object is to provide a variable load brake equipment which will operate in conjunction with the standard fluid pressure freight brake equipment to obtain the present application and release time intervals on a car without altering the flow capacities of any passages in the present standard freight brake equipment, including the usual retaining valve.

The objects set forth above are attained by the use of an apparatus mounted entirely on the body of the car, which apparatus is responsive to fluid from the brake pipe below a certain degree of pressure to first adjust itself against the car axle and then to position the movable fulcrum for a scale beam in a load compensating valve device for subsequent brake applications. The load compensating valve device is operative in response to the pressure of fluid in the brake cylinder pipe of the standard fluid pressure freight brake equipment to control passages, separate from those of the standard brake equipment, through which fluid from an independent reservoir may be supplied to and released from an additional brake cylinder at pressures in proportion to the standard brake cylinder pressure, which proportion is determined by the position of the movable fulcrum in said device.

Other objects and advantages will appear in the following more detailed description of the invention.

In the accompanying drawing the single figure is a diagrammatic view mainly in section of a variable load brake equipment embodying the invention.

As shown in the drawing, the variable load fluid pressure brake equipment may comprise the usual brake pipe 1, a branch pipe 2, a brake controlling valve device 3, a cut-off valve device 4, a load measuring apparatus 5, a check valve device 6, a locking mechanism 7, a load compensating valve mechanism 8, a transfer valve device 9, a brake cylinder device 10, which may be of the standard type, a load compensating brake cylinder device 11, a retaining valve device 12, an auxiliary reservoir 13, an emergency reservoir 14, a load reservoir 15, and a check valve device 16.

The brake controlling valve device 3 shown is of the "AB" type but may be of any other desired type. This device may be of substantially the same construction and have the same operating characteristics as the "AB" valve device fully described in the patent to Clyde C. Farmer, No. 2,031,213, issued February 18, 1936, and assigned to the assignee of the present invention, and in view of this it is deemed unnecessary to show and describe this device in detail. It will, of course, be understood that this device operates upon a service reduction in brake pipe pressure to supply fluid under pressure to effect a service application of the brakes, upon an emergency reduction in brake pipe pressure to effect an emergency application of the brakes, and upon an increase in brake pipe pressure to effect a release of the brakes and the charging of the brake equipment.

The cut-off valve device 4 may comprise a casing in which there is mounted a flexible diaphragm 17, at one side of which is a chamber 18 in constant open communication with the atmosphere by way of a passage 19, and at the other side of which there is a valve chamber 20 which is in constant open communication by way of a connected pipe and passage 21 with a brake pipe passage (not shown) in the brake controlling valve device 3. Slidably mounted in chamber 18 is a stop member 22 which is arranged to abut either a shoulder 23 formed in the wall of the chamber to limit the upward movement of the member or a ring 24 expanded into an annular groove in said wall to limit the downward movement of said member. Interposed between and operatively engaging the member 22 and the top wall of the chamber 18 is a spring 25 which, at all times, tends to move the stop member in a downward direction. Contained in the chamber 20 is a slide valve 26 arranged to be operated by a notched stem and follower 27 operatively secured to the flexible diaphragm 17 for controlling the operation of the locking mechanism 7 and the load measuring apparatus 5, as will hereinafter more fully appear.

The load measuring apparatus 5 may be of any desired construction, but for illustrative purposes is shown as comprising a bracket 28 which is mounted by any suitable means to the lower surface of a center sill 29, of which only the bottom cover plate is shown. The bracket includes arms 30 and 31 on which are operatively mounted a linkage or measuring mechanism 32 comprising a measuring element 33 having a horizontal portion 34, preferably disposed above the central portion of an axle 35 and parallel to the bottom of the center sill 29 and having a downwardly depending portion 36 which is normally spaced away from the axle a sufficient distance so that it will not be engaged by the axle when the vehicle is subjected to the usual service shocks.

Extending between the arms 30 and 31 and the measuring element 33 and operatively connected thereto are vertically spaced links 37 and 38, link 37 having one end pivotally connected by means of a pin 39 to the arm 30 and having the other end connected by means of a pin 40 to the upper end of the portion 36 of the measuring element 33. One end of the other link 38 is pivotally connected by means of a pin 41 to the arm 31 and the other end is connected by means of a pin 42 to the lower end of the depending portion 36, the axes of the pivot points at each end of the links being in vertical alignment and at equal distances so as to maintain the portion 34 substantially parallel with the center sill 29 in all positions of the linkage. The links 37 and 38 are each provided with a series of corresponding holes 43 and 44, respectively, for receiving the pins 40 and 42, respectively, to obtain a different degree of total vertical travel of the measuring element 33 to suit varied conditions, as set forth in Patent No. 2,402,434 issued on June 18, 1946, to Claude A. Nelson et al., and assigned to the assignee of the present invention in which the load measuring mechanism 5 is fully disclosed and claimed. Operatively connected between a lug 45 on the element 33 and a lug 46 on the center sill 29 is a tension spring 47 which, at all times, tends to move the measuring element toward the position in which it is shown and to normally hold the element in this position against accidental movement therefrom. For limiting the upward travel of the element 33, the horizontal portion is provided with a stop member 48 which engages the bottom of center sill 29 and is adjustable in the portion 34 by screw-threaded means. A roller 49 is mounted by means of a pin 50 on one end of a supporting member 51, which member is pivotally mounted at its other end to the arm 31 by means of the pin 41. For imparting movement to the element 33, the roller 49 is coupled to the lower end of the portion 36 by means of a strut member 52 which is mounted at its one end on the pin 50 and at its other end on the pin 42. This strut member is provided at the latter end with a series of holes 53 for adjusting the coupling between the roller 49 and the element 33 when a change is made in the location of the pin 42 in the link 38.

For actuating the roller 49, the load measuring apparatus 5 is provided with a casing which is integral with the bracket 28 and which is provided with a piston 54 having at one side a chamber 55 which is in constant open communication with the atmosphere by way of a passage 56, which chamber contains a spring 57 engaging a wall 58 of the chamber 55 and the non-pressure side of the piston 54 so as to tend to move the piston toward the position in which it is shown. A stem 59 of the piston 54 extends through chamber 55 and an opening in the wall 58 thereof and by means of a pin 60 is pivotally connected, with a shiftable lever 61 at a point intermediate the ends of the lever. For purposes which will appear more fully later, this lever 61 is located so that its lower end may be actuated into operative engagement with the roller 49.

At the other side of the piston 54 is a chamber 62 which is in constant open communication by way of pipe and passage 63 with a valve chamber 64 of the check valve device 6. This chamber contains a ball check valve 65, the under side of which is connected to the locking mechanism 7 by way of pipe and passages 66. The check valve device 6 is further provided with a passage 67 which by-passes the ball check and is of small flow capacity by reason of a choke 67a therein to insure the occurrence of the locking operation of the mechanism 7 before the chamber 62 is depleted of fluid under pressure as will hereinafter more fully appear.

The locking mechanism 7 comprises a casing which is provided with a piston 68 having at one side a chamber 69 in constant open communication with the cut-off valve device 4 by way of a connected pipe and passage 70. At the other side of the piston is a chamber 71 which is in constant open communication with the atmosphere by way of a passage 72, and contains a spring 73 which operatively engages the bottom surface of the chamber and piston 68 so as to tend to move the piston toward the position in which it is shown. A stem 74 attached to the piston 68 extends downwardly through the chamber 71 and terminates in a locking portion 75 which is slidably mounted in a downwardly opening slot 76 formed in the bottom of the casing. The locking portion 75 has a transverse opening 77 which is arranged to register with openings 78 formed in the wall of the slot 76. The upper surface of the bottom wall of the opening 77 in the locking portion 75 is toothed for making locking engagement with a correspondingly toothed portion 79 formed in one end of a fulcrum positioning bar 80, the opening 77 being large enough to provide sufficient clearance for moving the locking portion 75 of the stem 74 downwardly out of engagement with the bar.

Intermediate its ends, the bar 80 is operably connected to the lever 61 by means of a pin 81 which extends through a slot 82 formed in the upper end of the lever 61, the slot providing for the necessary relative movement between the lever and the bar when they are operated. Rotatably connected to the right-hand end of the bar 80 by means of a pin 83 is a fulcrum member 84 which may be shifted in the load compensating valve mechanism 8 in a manner to be described more fully later. Encircling the bar 80 is a helical spring 85 which engages the casing 86 of the mechanism 8 at one end and the lever 61 at the other end so as to urge the lever 61 and thereby the bar 80, fulcrum member 84 in the mechanism 8 toward the positions in which they are shown.

The load compensating valve mechanism 8 may comprise the casing 86 having a recess formed therein and having secured to the bottom thereof in any suitable manner a cap portion 87 which closes the open end of said recess, the inner surfaces of the recess and the cap portion defining a chamber 88 which is constantly open at its left-hand end to the atmosphere. This chamber contains the fulcrum member 84 and a scale beam lever 89 which is arranged to rock on the fulcrum member. Secured in any suitable manner to the top of the casing 86 is a cap portion 90, there being a sealing gasket 91 clamped between the casing 86 and the cap portion 90. This gasket 91 comprises laterally spaced flexible diaphragms 92 and 93 which are preferably of substantially the same area.

At one side of the diaphragm 92 is a chamber 94 which is open at all times to atmosphere by way of an opening 95 in the casing 86 and the atmospheric chamber 88. Contained in this chamber 94 and operatively engaged by the diaphragm 92 is a follower 96 having a stem 97 which extends through the opening 95 and which, at its lower end, is pivotally connected with one end of the lever 89. A spring 98 is interposed between the bottom surface of the chamber 94 and the follower 96 so as to tend to move the follower upwardly. At the other side of the diaphragm 92 is a chamber 99 which is connected to the brake cylinder device 10 by way of a passage and pipe 100, transfer valve device 9, and pipe 101, the specific connection through the transfer valve being later described.

At one side of the diaphragm 93 is a chamber 102 which is open at all times to atmosphere by way of an opening 103 and the atmospheric chamber 88 in the casing 86. Contained in this chamber 102 and operatively engaged by the diaphragm 93 is a follower 104 having a stem 105 which extends through the opening 103 and which, at its lower end, is pivotally connected with the lever 89 at a point located a short distance from its right-hand end so as to provide an arm 106 for engaging a fluted stem 107 of a release valve 108 to control the operation thereof. This release valve 108 is contained in a chamber 109 formed in the cap 87, which chamber is in constant open communication with the load compensating brake cylinder device 11 by way of a passage 110 and pipe 111. The valve 108 is constantly urged toward its seat by a spring 112 contained in chamber 109.

At the other side of the diaphragm 93 is a chamber 113 which is open to the underside of a supply valve 114 by way of a fluted stem 115 which extends into the chamber 113 and is arranged to be engaged by the diaphragm 93 so that the valve may be operated to control the supply of fluid under pressure to said chamber, whence it may flow to the load compensating brake cylinder device 11 by way of a passage 116 and the pipe 111.

The supply valve 114 is contained in a chamber 117 formed in the cap 90, which chamber is closed at the top by a cap nut 118. This chamber 117 is in open communication with the load reservoir 15 by way of a pipe and passage 119, and a pipe 120. Interposed between the cap nut 118 and the valve 114 is a spring 121 which at all times urges said valve toward its seating position.

The transfer valve device 9 comprises two spaced and axially aligned flexible diaphragms 122 and 123 which are rigidly clamped at their outer peripheries between two connected parts of the casing and at their inner peripheries to a stem 124. At the right-hand side of the diaphragm 123 is a valve chamber 125 which is in constant open communication with the brake cylinder pipe 101, and contained in this chamber is a slide valve 126 to be operated by a notched portion of the stem 124. Between the diaphragms 122 and 123 is a chamber 127 which is in constant open communication with the load compensating valve mechanism 8 and may, as will hereinafter appear, be supplied with fluid under pressure from chamber 125 by way of a passage 128. At the left-hand side of the diaphragm 122 is a chamber 129 which is open to the atmosphere by way of a passage 130. Contained in this chamber 129 and interposed between the left-hand wall of said chamber and an annular spring seat 131, mounted on the stem 124, is a spring 132 which tends to move said spring seat toward the right into engagement with a stop ring 133 expanded into an annular groove in the casing.

The brake cylinder devices 10 and 11 are operatively connected to a brake cylinder lever 134 by means of push rods 135 and 136, respectively, the load compensating brake cylinder device 11 being provided with a latch mechanism 137 which is attached to the piston of the brake cylinder device 11 and through which the usual notched push rod 136 is free to move relative to the piston and piston rod of the brake cylinder device 11 when said piston and piston rod are in release position. The device 11 is arranged so that when the piston and piston rod thereof are moved outwardly under the influence of the pressure of fluid supplied thereto, the latch mechanism 137 will engage the push rod 136 and thereby said piston will act on the brake cylinder lever 134 to add the force of brake cylinder device 11 to that applied to the lever by the brake cylinder device 10. While the brake cylinder device 10 may be any of the standard brake cylinders now used in fluid pressure brake equipment, it should be understood that its ratio of the lever or levers operated thereby will probably have to be substantially reduced to obtain lower braking forces from it, since, according to the invention, brake cylinder device 10 will provide the entire braking force only in the zones of braking for lighter gross weights.

OPERATION

Initial charging of the equipment

Assuming the vehicle embodying the invention to be empty and separated from a train, brakes on the vehicle released, the brake pipe 1 of the vehicle to be depleted of fluid under pressure and the fulcrum member 84 of the load compensating valve mechanism 8 to be temporarily disposed in the empty position in which it is shown, the brake controlling valve device 3 will be in brake applied position and the several other parts of the equipment will be in the positions in which they are shown.

Now if the empty vehicle is placed in a train, the brake pipe 1 will, of course, be connected at each end of the vehicle to the corresponding brake pipe at the adjacent end of each adjacent vehicle in the train and as a result will be charged with fluid under pressure in the usual manner. Fluid under pressure thus supplied to the brake pipe 1 flows through a branch pipe 2 to the chambers at the faces of the service and emergency pistons of the brake controlling valve device 3, moving them in due course to release and charging position. Fluid under pressure will then flow to the several chambers of the brake controlling valve device 3, and thence in the usual manner, to the auxiliary reservoir 13 by way of a pipe 138 and to the emergency reservoir 14 by way of a pipe 139. At the same time, fluid under pressure will also flow from an independent brake pipe passage in the valve device 3 to the load reservoir 15, by way of a pipe 140, check valve device 16, and pipe 120 and will also flow through pipe 21 and connected passage 141 to the valve chamber 20 in the cut off valve device 4, and thence through pipe 70 to chamber 69 of the locking mechanism 7. Upon an increase in the pressure of fluid in this chamber 69 to a predetermined value, piston 68 is caused to move downwardly against the opposing pressure of the spring 73, thereby moving the locking portion 75 out of locking engagement with the toothed portion 79 of the bar 80 and thus releasing the bar for operation by the lever 61.

The piston 68 as it moves downwardly passes the mouth of the passage 66, thereby establishing communication between chamber 69 of the locking mechanism and chamber 62 of the load measuring apparatus by way of said passage and check valve device 6. Fluid under pressure will flow from chamber 69 through pipe and passage 66, past ball check 65 to chamber 64 in the check valve device 6, and thence by way of pipe and passage 63 to chamber 62 at the face of the piston 54. In response to the pressure of fluid thus supplied to chamber 62, piston 54 will move to the right against the opposing pressure of spring 57, effecting, through the medium of the stem 59 and pin 60, the movement of the lever 61. Since the upper end of the lever 61 is held in its left-hand position by the pressure of the spring 85, the lever will be caused to rock in a counterclockwise direction about the pin 81. As the lever rocks in this manner it engages the roller 49 of the measuring mechanism 32, causing the connected member 51, roller 49 and pin 50 to rock in a clockwise direction about the pin 41. The member 52, being coupled directly to the pin 50 and to the pin 42 and thereby to member 51 and portion 36 of the measuring element, will force the element 33 downwardly against the opposing force of spring 47 until the bottom surface of the portion 34 of the element engages the periphery of the axle 35 at a point somewhere near the middle of its length, the links 37 and 38 rotating in unison in a clockwise direction to so control the element as to maintain the arm 34 thereof in parallel relation to the sill 29.

With the vehicle empty, the movement of the piston 54 will be taken up entirely in actuating the load measuring mechanism 32 and therefore no movement will be imparted to the fulcrum positioning bar 80 by the piston 54. The fulcrum member 84 of the load compensating valve mechanism 8 will therefore remain in the position in which it is illustrated, that is to say, in the position for braking an empty vehicle.

Now when the pressure of fluid in the valve chamber 20 of the cut-off valve device 4 has increased to approximately 30 pounds per square inch, the diaphragm 17 will be caused to deflect upwardly against the opposing pressure of the spring 25. The diaphragm, as it is thus deflected, acts through the medium of the follower 27 to shift the slide valve 26 to its uppermost position, in which position a cavity 142 in the slide valve connects pipe and passage 70 to a passage 143 which leads to the atmosphere. With this connection thus established, fluid under pressure in piston chamber 69 of the locking mechanism 7 will be vented to atmosphere by way of pipe and passage 70, cavity 142 and passage 143. Also, fluid under pressure will flow from chamber 62 of the load measuring apparatus 5 through pipe and passage 63, passage 67 of the check valve device 6, and pipe and passage 66 to chamber 69. Since the passage 67 is of restricted flow capacity, the fluid pressure in chamber 69 will reduce much more rapidly than that in chamber 62.

When the pressure of fluid in the chamber 69 is slightly less than that of the spring 73, said spring will act to shift the piston 68 upwardly, bringing the locking portion 75, through the medium of the stem 74, into locking engagement with the toothed portion 79 of the fulcrum shifting bar 80. With the piston 68 in its uppermost position, pipe and passage 66 are connected to atmosphere by way of chamber 71 and the atmospheric passage 72 therein. Fluid under pressure then flows from chamber 62 through pipe 63, passage 67 and pipe 66 to chamber 71 and thence to atmosphere by way of passage 72. When the fluid pressure acting on piston 54 of the measuring apparatus 5 is slightly less than the opposing pressure of spring 57, said spring will cause the piston 54, the stem 59, and the lever 61 to return to the positions in which they are shown. With the force of piston 54, which operates the measuring mechanism 32 removed, the spring 47 will act to retract the measuring mechanism to the position in which it is shown.

From the preceding paragraph it will be observed that the locking mechanism 7 is always operated to lock the fulcrum shifting bar 80, and thereby fulcrum member 84 of the load compensating valve mechanism 8, in their newly adjusted positions before the measuring mechanism 32 is retracted from the axle. With the chambers 62 and 69 thus vented of fluid under pressure, lock controlling piston 68, measuring apparatus controlling piston 54, and lever 61 which has been displaced are now returned to the positions in which they are shown; and, the cut-off valve device 4 being maintained by fluid at brake pipe pressure in the position to which it was previously moved, the equipment is now conditioned for braking an empty vehicle.

*Application of the brakes on an empty vehicle*

When it is desired to effect an application of the brakes, the brake pipe pressure is reduced in the usual manner, causing the brake controlling valve device 3 to function to supply fluid under pressure from auxiliary reservoir 13 to the brake cylinder device 10 in order to advance the usual brake shoes, not shown, into frictional engagement with the vehicle wheels. The flow of fluid under pressure from auxiliary reservoir 13 to the brake cylinder device 10 is by way of a pipe 138 through brake controlling valve device 3 and brake cylinder pipe 101. At the same time, fluid under pressure flows from pipe 101 through pipe and passage 144 to chamber 125 in the transfer valve device 9.

On a slight increase in the pressure of fluid in the chamber 125 of the transfer valve device 9, diaphragm 123 will be caused to flex, moving the stem 124 to the left as viewed in the drawing, until the shoulder 145 engages the spring seat 131, whereupon further movement of the diaphragm 123 will be resisted by the spring 132 acting through said spring seat.

When the stem 124 is moved to a position in which its movement is resisted by the spring 132, the slide valve 126 will still be in a position to cut off the flow of fluid from the chamber 125 to the passage 128.

Upon the further increase in the pressure of the fluid in the chamber 125 to approximately 8 pounds, which pressure is the same as that supplied to the brake cylinder device 10, diaphragm 123 will be moved against the opposing pressure of spring 132, causing the slide valve 126 to uncover the passage 128, so that fluid may now flow from the chamber 125 to the passage 128, and therethrough to the chamber 127 on the opposite side of the diaphragm 123 and also to the chamber 99 above the diaphragm 92 of the compensating valve device 8.

Upon the supply of fluid under pressure to chamber 127, the power of diaphragm 123 to overcome the pressure of spring 132 is diminished and continues to diminish as the fluid pressure in chamber 127 increases, up to a certain degree to be explained later. The pressure of fluid in chamber 127 also acts on the diaphragm 122 to decrease the effective force transmitted from the spring 132 to the stem 124, but it will be understood that this spring force will still be sufficient to cause the stem 124 to move to shift the slide valve 126 to the right and cut off the further flow of fluid from chamber 125 to passage 128 and chamber 127 when the pressure in chamber 127 has reached a predetermined degree in relation to the pressure in the chamber 125. It is preferred that the relation of the diaphragm areas and the spring force be such that at approximately 50 pounds pressure (equalization point between the brake cylinder and auxiliary reservoir pressures) the diaphragm 123 will be ineffective, and in response to this pressure, diaphragm 122 will be effective to maintain the stem 124 and slide valve 126 in their extreme left-hand position. Thus the 8 pound difference in the pressure of fluid in chamber 125 over that in chamber 127 is decreased in proportion to the degree of increase in the brake application until at a full service application (50 pounds brake cylinder pressure) the pressures in these chambers are equal.

With the vehicle empty, the fulcrum member 84 will be in the position in which it is shown in the drawing, in which position the diaphragm 92 will be prevented, by the fulcrum member 84, from moving the follower 96 and stem 97 downwardly in response to the pressure of fluid in the chamber 99. Scale beam lever 89, and consequently valves 114 and 108, will remain in the positions in which they are shown. The mechanism 8 being inoperative to cause the load compensating cylinder device 11 to operate, the brake cylinder device 10 alone will do the braking. As will appear later, it may be desirable to continue this same braking condition through a zone of light loading for a certain class of cars. This may be done by having lost motion by any suitable means in the measuring apparatus 5 so that the roller 84 will not be moved until the center sill 29, as a result of loading on the vehicle, has come within a certain vertical distance of the car axle.

*Release of the brakes with the equipment conditioned for empty car operation*

When it is desired to effect a release of the brakes, the brake pipe pressure is increased in the usual manner causing the brake controlling valve device 3 to function to establish communication from the brake cylinder device 10 to atmosphere by way of the retaining valve device 12. Fluid under pressure now flows by way of pipe 101 from the brake cylinder device 10 to the brake controlling valve device 3, and from there by way of a pipe 146 to the retaining valve device 12 which connects pipe 146 directly to atmosphere when a handle 147 on the device 12 is in the position in which it is shown. Brake cylinder device 10 now responds to the release of fluid under pressure therefrom in the usual manner to effect a release of the vehicle brakes. Upon the release of fluid under pressure from the pipe 101, fluid will also be released from the chamber 125 of the transfer valve device 9 by way of pipe 144, pipe 101, brake controlling valve device 3, pipe 146, and the retaining valve device 12 to atmosphere.

Upon release of fluid from chamber 125, diaphragm 123 will be moved to the position in which it is shown in the drawing by the pressure of the fluid in the chamber 127, and thereafter fluid from the chamber 127 will flow to the chamber 125 by way of passage 128, passage 148, past ball check valve 149, and passage 150. Fluid from chamber 99 of the load compensating valve device 8 will also flow to chamber 125 by way of pipe and passage 100, passage 128, passage 142, past ball check 143 and passage 144.

Since the volume of pipe 100 and chamber 99 in relation to the volumes employed in the standard freight brake equipment is negligible, the fluid pressure brake equipment may be considered as functioning in a normal manner.

*Automatic changeover operation of the equipment of a partially loaded vehicle*

Let us assume now that the brakes on the vehicle are released and that the vehicle is separated from the train and that while the brake pipe is at atmospheric pressure, lading is placed on the body of the vehicle. Under the influence of such additional weight, the vehicle body and consequently the center sill 29, will move downwardly relative to the axle 35 by reason of the usual truck spring (not shown) yielding to the additional weight.

Now when the vehicle is connected in a train, the brake pipe starts to charge with fluid under pressure in the same manner as hereinbefore described in connection with the charging of an empty vehicle. As before described, fluid under pressure which is supplied to the brake pipe 1 flows to chamber 20 in the cut-off valve device 4, whence it flows by way of pipe and passage 70 to chamber 69 in the locking mechanism 7. In response to the pressure of fluid in chamber 69 of the locking mechanism 7, piston 68 will move downwardly against the pressure of spring 73, thereby causing the locking portion 75 to move out of locking engagement with the toothed portion 79 of the bar 80, the piston when it has moved a sufficient distance to effect the unlocking of the bar 80 permitting fluid under pressure to flow by way of check valve device 6, to chamber 62 in the measuring apparatus 5. The pressure of fluid thus admitted to chamber 62 will cause the piston 54 to actuate the lever 61 to effect the operation of the measuring mechanism 32 until the mechanism is stopped by portion 34 of the element 33 of the mechanism engaging the axle 35, the lever moving in a counter-clockwise direction about the pin 81 which, at this time, is held stationary by the spring 85.

The space between the center sill 29 and the axle 35, and consequently between the portion 34 of the measuring element 33 and the axle, having been shortened because of the yielding of the body supporting springs under the influence of the load, the portion 34 will engage the axle 35 before piston 54 has completed its full stroke. As a result, the piston 54 will now cause the lever 61 to rotate in a clockwise direction about its lower end which is now in engagement with the roller 49 of the now stationary measuring mechanism 31, the roller of course being stationary and serving as a fulcrum for the lever. Movement of the upper end of the lever 61 in this direction will be opposed by the force of spring 85 while the piston 62 completes its stroke. The lever 61, as it is thus being moved acts to shift the bar 80 and fulcrum roller 84 associated therewith towards the right along the scale beam lever 89 until such time as the piston 54 comes to a stop at the end of its stroke, the distance of travel of the roller 84 being proportional to the distance said piston travels after the measuring element 33 is brought to a stop by its engagement with the axle.

When the brake pipe pressure is increased to the degree required to effect the operation of cut-off valve device 4, this device will operate as described before to vent fluid under pressure from the chambers 69 and 62. With the chamber 69 thus vented, the piston 68 and the stem 74 of the locking mechanism 7 respond to the force of spring 73 to move the locking portion 75 into engagement with the toothed portion 79 of the bar 80 to hold the bar and thereby the fulcrum member 84 in their newly assumed positions.

With the chamber 62 of the load measuring apparatus 5 vented of fluid under pressure, the spring 57 acts to return the piston 54 and piston stem 59 to the position in which they are shown. In so doing, it will cause the lever 61 to be rotated clockwise about the pin 81 which is now locked through the medium of the bar 80 and portion 75 in a position for a partially loaded vehicle. As the lower end of the lever 61 is withdrawn from engagement with the measuring mechanism 32, the spring 47 will act to retract the mechanism from engagement with the axle 35 to the position in which it is shown.

With the position of the fulcrum member 84 relative to the scale beam lever 89 of the load compensating valve mechanism 9 determined according to the amount of movement of piston 54 transferred by the lever 61 from the mechanism to the fulcrum shifting bar 80, and the transfer of movement being determined according to the load on the vehicle, the load compensating valve device is now in condition for braking a partially loaded vehicle.

*Application of the brakes on a partially loaded vehicle*

When an application of the brakes is made on a partially loaded vehicle by effecting a reduction in brake pipe pressure, the operation of the brake controlling valve device 3 will be identical with the operation described for an empty vehicle. From this it will be understood that fluid under pressure will be supplied through pipe 101 to the brake cylinder device 10, from pipe 101 to chamber 125 in the transfer valve device 9 by way of pipe 144, and therefrom to the chamber 99 in the load compensating valve mechanism 8 by way of passage 128 and pipe 100 in a manner previously described for the application of the brakes on an empty vehicle.

The pressure of fluid in the chamber 99 tends to deflect the diaphragm 92 and the follower 96 downwardly against the opposing pressure of spring 98. When the fluid pressure in chamber 99 is sufficient to overcome the pressure of spring 98, (about five pounds per square inch), the follower 96 and stem 97 will be caused to move downwardly, thereby rocking lever 89 in a counter-clockwise direction about the roller 84, which is now located at some point intermediate the position in which it is shown and the middle of the lever 89. As the lever is thus rocking it permits the spring 112 to act to seat the exhaust valve 108 and causes the diaphragm 93 to deflect upwardly against the stem 115 and thereby against the opposing force of spring 121 to unseat the supply valve 114. With the supply valve unseated, fluid under pressure flows from the supply valve chamber 117 past the fluted stem 115 of the valve, through diaphragm chamber 113, passage 116, and pipe and passage 111 to the load compensating brake cylinder device 11.

Now when the pressure of fluid in diaphragm chamber 113, acting on the diaphragm 93, together with the pressure of springs 98 and 121 becomes slightly greater than that required to balance the force of diaphragm 92 acting through the lever 89, the diaphragm 93 will deflect downwardly permitting the supply valve 114 to seat, the valve as it is thus closed cutting off further flow of fluid under pressure to the diaphragm chamber 113 and consequently to the brake cylinder device 11. With the flow of fluid to the chamber 113 cut off, the downward flexure of the diaphragm 93 ceases and the lever 89 comes to a stop before the arm 106 thereof operatively engages the stem 107 of the release valve 108 so that the release valve will remain seated.

It should be noted that the pressure of fluid obtained in the brake cylinder device 11 and diaphragm chamber 113 will be less than that effective in the diaphragm chamber 99 by an amount proportional to that (for instance 5 pounds) required to initially deflect diaphragm 92 against springs 98 and 121. The spring 121 is merely a bias spring and may be neglected in this consideration. The difference in pressures just noted will be present throughout the range of pressures in the brake cylinder device 11 while the additional 8 pound difference between the pressures present in the brake cylinder devices 10 and 11 gradually diminishes as the pressure in the brake cylinder device 10 increases and as will hereinafter appear is non-existent when the latter pressure decreases.

When in effecting an application of the brakes on a partially loaded vehicle, fluid under pressure is supplied to the brake cylinder device 10, said device functions to actuate the brake cylinder lever 134 to first cause the slack in the brake rigging to be taken up and then to cause the push rod 136 of the load brake cylinder device 11 to be moved outwardly relative to its associated piston rod and piston. At approximately 13 pounds pressure in the brake cylinder device 10 the slack in the brake rigging will have been taken up and fluid under pressure is supplied from the load reservoir 15 to the load brake cylinder device 11. As the piston and piston rod of the device 11 move out under the influence of the pressure of fluid supplied thereto, the latch mechanism 137 functions in the usual well known manner to latch the notched push rod 136, so that further movement of the piston of the load brake cylinder device 11 now acts, through the medium of the latch mechanism and push rod, on the brake cylinder lever 134 to add the force of the load brake cylinder device 11 to that of the brake cylinder device 10.

*Release of the brakes with the equipment conditioned for a partially loaded vehicle*

When it is desired to effect a release of the brakes on a partially loaded vehicle, the brake controlling valve device 3 will function in response to an increase in brake pipe pressure to vent fluid under pressure from the brake cylinder device 10 to atmosphere by way of pipe 101, valve device 3, pipe 146, and an atmospheric passage in the retaining valve device 12 and cause the brake cylinder device 10 to respond in the usual manner to effect a release of the brakes.

Since chamber 125 in the transfer valve device 9 is connected to the pipe 101 by way of pipe 144, the resulting reduction in the pressure of the fluid in chamber 125 will render spring 132 in the transfer valve device 9 effective to move slide valve 126 to the position for opening passage 150 to chamber 125, whereby the pressure of fluid in diaphragm chamber 99 will reduce substantially with the reduction in pressure in the brake cylinder device 10.

When the pressure of fluid in chamber 99 is decreased, the spring 98 will cause the diaphragm 92 to move upwardly and thereby rock the lever 89 about the fulcrum member 84 in a clockwise direction to unseat the release valve 108 through the medium of the arm 106 and valve stem 107. With the valve 108 unseated, fluid under pressure is vented from the brake cylinder device 11 to the atmosphere by way of pipe and passage 111, passage 110, release valve chamber 109, and past the unseated valve 108 and its fluted stem 107 into the atmospheric chamber 88. Since the diaphragm chamber 113 is connected by way of passages 116 and 119 to chamber 109, chamber 113 will be vented of fluid under pressure. When the pressure of fluid in chamber 113 has been reduced to slightly below the opposing force of the diaphragm 92 acting through the medium of the lever 89, the diaphragm 92 will act to rock the lever 89 in a counterclockwise direction about the fulcrum member 84 permitting the spring 112 to seat the valve 108 and cut off the further flow of fluid under pressure from the brake cylinder device 11 and diaphragm chamber 113 to atmosphere. With the flow of fluid thus cut off diaphragm 93 will promptly come to a stop without unseating the supply valve 114.

In effecting a full release of fluid under pressure from the brake cylinder device 10, the pressure of fluid in chamber 99 and in the load brake cylinder device 11 will continue to reduce as above described until the pressure in said brake cylinder device is reduced to slightly below the pressure of spring 98, whereupon said spring will maintain the release valve 108 unseated.

If a complete release of the brakes is desired, the pressure of fluid in the brake cylinder device 10 and in diaphragm chamber 99 will continue to reduce to atmospheric pressure as will be apparent. When the pressure in the brake cylinder device 10 and in diaphragm chamber 99 is thus reduced to a degree which substantially counterbalances the pressure of the control spring 98, the pressure of fluid in chamber 118 and in the load brake cylinder device 11 will be at substantially atmospheric pressure. It will therefore be noted that the piston in the brake cylinder device 11 will be permitted to return to its release position while pressure is still effective in the empty brake cylinder device 10 to hold its piston in application position, as a result of which the latch mechanism 137 will be permitted to release the notched rod 136 to thus prevent damage to the brake cylinder device 11.

From this it will be seen that with the vehicle partially loaded fluid pressure in brake cylinder device 11 not only increases in amounts proportionate to the increase of fluid pressure in the brake cylinder device 10, but when the pressure in brake cylinder device 10 is reduced, the load compensating valve device 8 will operate automatically to effect a proportionate reduction in the pressure of fluid in the brake cylinder device 10. It should be noted that the increases and decreases in the pressure of fluid in brake cylinder device 11 are effected by way of passages and ports that are apart from brake controlling valve device 3 and retaining valve device 12, and will in no way affect the timing of the functions of the valve device 3 or the retaining valve device 12.

It will readily be seen that as the load increases, the fulcrum member 84 is shifted further to the right until it reaches the position at the middle of the lever 89, at which point the leverage ratio will be 1 to 1 and the fluid pressure in the load brake cylinder device 11 plus the pressure of the spring 98 will equal the fluid pressure in the brake cylinder device 10.

It should be understood that, while this variable load brake has been described as being adjustable to compensate for loading over the full range from empty to maximum load, it may be considered desirable to have the load compensating adjustment made in the zone of the loading under which the car may be most frequently used in service. For example, it may be desirable to have the increases in the load brake cylinder pressure according to the load on the vehicle made in the range from 20% to 70% of load capacity. That is, the standard brake cylinder device 10 alone would provide the braking force for empty cars and cars loaded up to 20% of their load capacity. It should here be mentioned that the word "empty" as used in the claims in connection with the vehicle is intended to mean a light vehicle i. e. a vehicle carrying a relatively small load, or none at all. From this point on up, the load compensating valve mechanism would become operative to cut in the load brake cylinder device 11 and increase the fluid pressure therein for a given reduction in brake pipe pressure as the load increases up to 70% of load capacity. At this point, the fulcrum member 84 would be at the middle of the lever 89, thus providing approximately a 1 to 1 ratio between the pressure in the standard brake cylinder device and the load brake cylinder device 11.

It is here pointed out that the increments in the displacement of the fulcrum member 84 per unit of loading increase as the load increases within the prescribed range of operation. This is desirable because the ratio of braking force to the gross weight of the vehicle is fundamentally, or naturally, high for an empty vehicle. It will be apparent, therefore, that the need for additional braking force in the zone of relatively light loading will not be urgent. By reason of the increments increasing in magnitude per unit of load weight in the service range (20% to 70% in this example) of loading, the ratio of braking force to the gross weight of the vehicle may be kept at any desirable constant up to 70% of load maximum.

While the compensation for loading may be desirable in the 20% to 70% range for box cars, it might not be desirable for other types of cars, such for instance as gondolas or flat cars of the type which will probably carry relatively heavier loads. In such cases, the operating range for the load compensating valve device may be shifted to a range possibly from 50% to 100% loading.

The point at which the load compensating valve mechanism cuts into operation may be controlled by the determining the amount of movement the measuring mechanism 32 may undergo before engaging the axle by using different pairs of holes 43 and 44 in the links 37 and 38, respectively. This characteristic might also be controlled by having the bar 80 telescope during the initial movement of the mechanism 32 and lever 61 and thereafter act as a thrust member to position the fulcrum member 84. Or again, the starting position of the fulcrum member 84 might be shifted to the right or the left of the position in which it is shown.

The extent of the loading range over which the load compensating valve mechanism is adjustable is determined by the ratio in the lever 61 and may therefore be varied by using a lever of a different leverage ratio.

Another feature of this device to be noted is that by reason of the fact that the load brake cylinder device is supplied with and released of fluid under pressure by way of passages which are entirely independent and apart from brake controlling valve device 3 or the retaining valve device 11 this variable load brake is controlled in unison with the standard "AB" freight brake equipment. This feature assumes its greatest importance in controlling the brakes when the vehicle is descending a long grade.

Preparatory to descending a grade, the retaining valve device 12 is set by turning the handle 147 thereof upwardly from the position in which it is shown in the drawing, to retain a predetermined pressure, for example 10 pounds, in the brake cylinder device 10 when recharging the reservoirs 13 and 14 after the initial application. In controlling the train on a descending grade, it is customary to cycle the brakes, that is, to effect an application of the brakes and then recharge the equipment while a partial release of the brakes is taking place through the retaining valve device which has been set, as just described, to retain a predetermined pressure in the brake cylinder, and alternately applying and releasing the brakes as often as is deemed necessary. After the retaining valve device has been set to retain a predetermined pressure in the brake cylinder device 10, subsequent applications of the brakes will be effected in substantially the same manner as before described. Since the retaining valve device 12 is operative to retain fluid pressure of 10 pounds in the brake cylinder device 10, the push rod 135 thereof and consequently the brake lever 134 will not be retracted. The pressures of fluid and springs in the transfer valve device 9 and the load compensating valve mechanism 8 are so arranged that the load brake cylinder device 11 will not be vented of fluid under pressure until the pressure of fluid in the brake cylinder device 10 will have reached a minimum of four pounds per square inch. Therefore, brake cylinder device 11, when the retaining valve device 12 is effective, will likewise have retained therein a pressure determined by the retained pressure in brake cylinder 10 effective in chamber 93, the opposing pressure of spring 98 and the position of the fulcrum roller 84, and because of this the push rod 136 will likewise stay at its extended position. It will be apparent therefore, that the time intervals required for application or release of the brake cylinder devices 10 and 11 will be the same as that required for the standard brake cylinder device of the "AB" freight brake equipment, and with the standard brake retaining valve device the operation is unaltered. This variable load brake will consequently not interfere with the train operation of the standard freight brake equipment. As a result of providing additional braking force corresponding to the additional load on the vehicle this variable load brake will be more responsive to control by the manipulation of the brake valve device at the locomotive of the train, and will, therefore, in grade service permit the decent of trains of this type at a much more rapid rate.

Having now described my invention, what I claim as new and desire to secure by Letters Patent, is:

1. In a fluid pressure brake equipment, in combination, a brake cylinder device for providing braking power on an empty vehicle, a second brake cylinder device arranged to be cut into operation to provide increased braking power on the vehicle when the vehicle is carrying a load, valve means conditionable according to the load carried by the vehicle for operation to cut said second brake cylinder into operation and for operation in accordance with any increase in the pressure of fluid in the first mentioned brake cylinder to provide a proportional increase in the pressure of fluid in said second brake cylinder, piston means movable the same distance during each operation for conditioning said valve means, and a measuring mechanism operatively connecting said piston means to said valve means, said mechanism comprising a lever pivotally mounted intermediate its ends to said piston means and arranged to operate under the power of said piston means to first rock about one end to measure the load and then to rock about its other end to condition said valve means, the conditioning of said means being different for different loads carried by the vehicle so as to render said means operative to provide different proportional increases in the pressure of fluid in said second brake cylinder device.

2. In a fluid pressure brake equipment for a vehicle having an unsprung or relatively fixed part, in combination, a brake cylinder, and control apparatus movable vertically relative to said unsprung part different distances under the influence of differences in the weight of the lading carried by the vehicle and being adjustable for operation to admit fluid under pressure to the brake cylinder and to control the pressure of fluid in the brake cylinder, said control apparatus comprising measuring means movable into abutting engagement with said unsprung part for determining the adjustment of the control apparatus, a lever operative to actuate said means, and means movable a fixed distance for actuating said lever, said measuring means when in engagement with said unsprung part serving as a fulcrum for said lever to cause the lever to be operated by the movable means to effect the adjustment of said control apparatus in increments increasing in magnitude according to the weight of the lading on the vehicle.

3. In a fluid pressure brake equipment for a vehicle having an unsprung or relatively fixed part, in combination, a brake cylinder, and control apparatus movable vertically relative to said unsprung part different distances under the influence of differences in the weight of the lading carried by the vehicle and being adjustable for operation to admit fluid under pressure to the brake cylinder and to control the pressure of fluid in the brake cylinder, said control apparatus comprising measuring means movable into abutting engagement with said unsprung part for determining the adjustment of said control apparatus, a lever for actuating said measuring means and for effecting the adjustment of the said control apparatus, a fulcrum for said lever about which said lever is rockable to actuate said measuring means, and means movable a fixed distance for actuating said lever, said measuring means when in engagement with said unsprung part cooperating with said lever to cause the lever to be operated by the movable means and through the medium of said fulcrum to effect the adjustment of said control apparatus in increments increasing as the weight of the lading on the vehicle increases.

4. In a fluid pressure brake equipment for a vehicle having an unsprung or relatively fixed part, in combination, a brake cylinder, and control apparatus movable vertically relative to said unsprung part different distances under the influence of differences in the weight of the lading carried by the vehicle and being adjustable for operation to admit fluid under pressure to the brake cylinder and to control the pressure of fluid in the brake cylinder, said control apparatus comprising measuring means movable into abutting engagement with said unsprung part for determining the adjustment of the control apparatus, a variable lever relay including means shiftable to various positions along the lever to effect the adjustment of said control apparatus, a lever for actuating the measuring means and for shifting the shiftable means, a fulcrum for the last mentioned lever carried by said shiftable means and about which said lever is rockable in a counterclockwise direction to actuate said measuring means into engagement with said unsprung part, said measuring means when in engagement with the unsprung part serving as a fulcrum about which the lever is rockable in a clockwise direction to shift the first mentioned fulcrum and thereby the shiftable adjusting means, and means movable a fixed distance for actuating said lever and thereby said shiftable means in increments increasing as the weight of the lading on the vehicle increases.

5. In a fluid pressure brake equipment for a vehicle having an unsprung or relatively fixed part, in combination a brake cylinder, and control apparatus movable vertically relative to said unsprung part different distances under the influence of differences in the weight of the lading carried by the vehicle and being adjustable for operation to admit fluid under pressure to the brake cylinder and to control the pressure of fluid in the brake cylinder, said control apparatus comprising measuring means movable into abutting engagement with said unsprung part for determining the adjustment of the control apparatus, a variable lever relay valve device including means shiftable to various positions along the lever to effect the adjustment of said control apparatus, a lever for actuating the measuring means for shifting the shiftable means, a fulcrum for the last mentioned lever carried by said shiftable means and upon which said lever is rockable in a counterclockwise direction to actuate said measuring means into engagement with said unsprung part, said measuring means when in engagement with the sprung part serving as a fulcrum about which the lever is rockable in a clockwise direction to shift the first mentioned fulcrum and thereby the shiftable means, means movable a fixed distance for actuating said lever, and yieldable pressure means opposing movement of said lever in the clockwise direction until the measuring means engages the unsprung part.

6. A vehicle fluid pressure brake equipment, in combination, a pair of reservoirs charged with fluid under pressure, a pair of brake cylinders, a brake controlling valve device operative upon a reduction in brake pipe pressure to supply fluid under pressure from one of said reservoirs to one of said brake cylinders, a variable lever ratio relay valve means responsive to an increase in fluid pressure in one of said brake cylinders to supply fluid under pressure from the other of said reservoirs to the other of said brake cylinders, and means operative according to a certain degree of increase in the load on the vehicle to adjust said variable leverage ratio relay valve means for operation to increase the pressure in said other brake cylinder a certain proportionate degree in relation to the pressure in said one brake cylinder and operative according to an additional like degree of increase in loading to increase the pressure of fluid in said other brake cylinder a greater proportionate degree in relation to the pressure of fluid in said one brake cylinder.

7. A vehicle fluid pressure brake equipment, in combination, a pair of reservoirs charged with fluid under pressure, a pair of brake cylinders, a brake controlling valve device operative upon a reduction in brake pipe pressure to supply fluid under pressure from one of said reservoirs to one of said brake cylinders, a variable leverage ratio relay valve means responsive to an increase in fluid pressure in said one brake cylinder to supply fluid under pressure from the other of said reservoirs to the other of said brake cylinders, and means operative according to a certain load on the vehicle to adjust said variable leverage ratio valve means for operation in response to a chosen pressure of fluid in said one brake cylinder to provide a certain pressure of fluid in said other brake cylinder and operative according to a heavier load on the vehicle in response to said certain pressure in said one brake cylinder to provide a certain higher brake cylinder pressure in said other brake cylinder, the increment of change in the pressure of fluid in said other brake cylinder being increasingly greater for each increment of change in the load carried by the vehicle.

8. The combination with a vehicle having a sprung part and an unsprung part, said sprung part being movable vertically relative to said unsprung part distances varying according to different loads carried by the sprung part and a fluid pressure brake equipment carried by said sprung part and conditionable according to the distance the sprung part moves vertically relative to the unsprung part for operation to provide the braking power called for by the load carried, of a variable leverage ratio relay valve means carried by said sprung part and adapted to cooperate with said unsprung part for conditioning said fluid pressure brake equipment, said mechanism comprising a shiftable fulcrum cooperating with said fluid pressure brake equipment and being adjustable to condition the fluid pressure brake equipment, a measuring element carried by said sprung part adapted to be moved into engagement with said unsprung part, a lever operative to actuate said element and shiftable fulcrum, and means movable a fixed distance for actuating said lever, said lever when being actuated by said means first rocking in one direction to effect the movement of said element into engagement with said unsprung part and then rocking in the opposite direction to effect the adjusting movement of said fulcrum.

9. The combination with a vehicle having a sprung part and an unsprung part, said sprung part being movable vertically relative to said unsprung part distances varying according to different loads carried by the sprung part and a fluid pressure brake equipment carried by said sprung part and conditionable according to the distance the sprung part moves vertically relative to the unsprung part for operation to provide the braking power called for by the load carried, a brake pipe included in said fluid pressure brake equipment and being normally charged with fluid under pressure, of a mechanism carried by said sprung part and adapted to cooperate with said fluid pressure brake equipment for conditioning the equipment, said mechanism comprising a member cooperating with said fluid pressure brake equipment and being adjustable to condition the equipment, locking means for normally maintaining said member in any position to which it may be adjusted, measuring mechanism carried by said sprung part and including a measuring element movable relative to said sprung part into and out of engagement with an unsprung part, lever means operative to first actuate said measuring element into engagement with said unsprung part and to then actuate said member, fluid pressure responsive means for actuating said lever means and having a fixed distance of travel, means responsive to a low brake pipe pressure in initially charging the brake pipe for first unlocking said member and then admitting fluid under pressure to said fluid pressure responsive means to cause the fluid pressure responsive means to function to actuate said lever, means responsive to brake pipe pressure when the brake pipe pressure has been increased above said low pressure for effecting the operation of the locking means into locking relationship with said member, said locking means as it moves into locking position venting fluid under pressure from said fluid pressure responsive means to effect the operation of the fluid pressure responsive means to actuate said lever out of engagement with said measuring mechanism, and means operating to move said measuring element out of engagement with said unsprung part as said lever is being moved toward its disengaging position.

10. In a fluid pressure brake, in combination, a brake cylinder device for providing braking power on an empty vehicle and a second brake cylinder device arranged to be cut into operation to provide increased braking power on the vehicle when the vehicle is carrying a load, valve means conditionable according to the load carried by the vehicle for operation to cut said second brake cylinder into operation and for operation in accordance with any increase in the pressure of fluid in the first mentioned brake cylinder device to provide a certain proportional increase in the pressure of fluid in said second brake cylinder device, a load measuring mechanism for conditioning said valve means, and piston means movable the same distance during each conditioning operation, the initial movement of the piston being utilized to measure the load and the remainder of the movement being utilized to condition said valve means accordingly whereby the increment of change in the pressure of fluid in said second brake cylinder device is increasingly greater for each increment of change in the load carried by the vehicle.

11. The combination with a vehicle fluid pressure brake equipment of the type having a first brake cylinder and a second brake cylinder and also having a brake controlling valve device for varying the pressure of fluid in said first brake cylinder, of valve means operative in accordance with variations in the pressure of fluid in said first brake cylinder for varying the pressure of fluid in said second brake cylinder, adjustable lever means for regulating said valve means to variously proportion the pressure of fluid in said second brake cylinder in varied ratio increments with respect to the pressure of fluid in said first brake cylinder according to the adjustment of the adjustable lever means, and piston means movable a fixed distance during each operation for actuating said adjustable lever means, the adjustable lever means comprising a lever pivotally mounted intermediate its ends to said piston means and arranged to be rocked by said piston means during each operation first about one end to measure the load carried by the vehicle and then about the other end to regulate said valve means accordingly.

12. In a load compensating mechanism for a vehicle fluid pressure brake equipment, a variable leverage ratio relay valve mechanism comprising a member adjustable for conditioning the fluid pressure brake equipment for operation to provide the braking power called for by the load carried, a measuring mechanism operable to a position for ascertaining the amount of load carried by the vehicle and adjusting said member to a corresponding position, fluid pressure motor means operable upon an increase in fluid pressure to actuate said mechanism to said position and operable upon a decrease in fluid pressure to retract said mechanism from said position, and means normally locking said member in its adjusted position and operative in response to fluid pressure to first unlock said member and then to admit fluid under pressure to said motor means.

13. In a variable load brake apparatus having a brake pipe in which the pressure of fluid may be varied for controlling the application of the brakes, an adjusting mechanism for varying the degree of brake application for a given brake pipe reduction according to the weight of the load on the vehicle, said mechanism comprising a member which is movable to different positions for conditioning the equipment for various braking characteristics, a measuring element having a normal position and operable therefrom to determine the weight of the load on the vehicle and to position said member accordingly, and fluid pressure motor means operative in response to an increase in pressure to operate said element to its measuring position and operative in response to a decrease in pressure to retract said element to its normal position, a source of fluid supply in which the pressure may be varied, locking means for locking said mechanism in its adjusted position comprising a latch, resilient means normally holding said latch in locking engagement with said member, means responsive to fluid pressure to move the latch out of said locking engagement, and means operative in response to an increase of fluid pressure at said source above a chosen degree to vent the fluid under pressure from said locking means and said motor means at different rates so as to lock said member in its adjusted position before said element is retracted from its measuring position.

14. In a load compensating mechanism for a vehicle fluid pressure brake equipment, a variable leverage ratio relay valve mechanism comprising a member adjustable for conditioning the fluid pressure brake equipment for operation to provide the braking power called for by the load carried, a measuring mechanism operable to a position for ascertaining the amount of load carried by the vehicle and adjusting said member to a corresponding position, fluid pressure motor means operable upon an increase in fluid pressure to actuate said mechanism to said position and operable upon a decrease in fluid pressure to retract said mechanism from said position, a source of fluid supply in which the pressure may be varied, locking means for locking said member in its adjusted position comprising a latch, resilient means normally holding said latch in locking engagement with said member, and means responsive to fluid pressure to move the latch out of said engagement, and means for supplying fluid under pressure from said source when below a chosen degree of pressure to said motor means and said locking means, said means being operative in response to an increase in pressure at said source above said chosen degree to vent the fluid pressure from said locking means and said motor means at different rates of flow so as to lock said member in its adjusted position before said element is retracted from its operative position.

15. In a variable load brake equipment for a vehicle having a sprung part and an unsprung part, a variable leverage fluid pressure valve device comprising a fulcrum member adjustable to empty and load positions and to positions therebetween, and means cooperable with said fulcrum member to vary the degree of brake application on said vehicle according to the position of said fulcrum member, adjusting means operable in accordance with the position of said sprung part with respect to said unsprung part to correspondingly adjust said fulcrum member in the direction of said load position, and means for biasing said fulcrum member in the direction of said empty position against force of said adjusting means.

16. In a variable load brake equipment for a vehicle having a sprung part and an unsprung part, a variable leverage fluid pressure valve device comprising a fulcrum member adjustable to empty and load positions and to positions therebetween, and means cooperable with said fulcrum member to vary the degree of brake application on said vehicle according to the position of said fulcrum member, adjusting means comprising a piston operable by fluid under pressure and means operable by said piston in accordance with the position of said sprung part with respect to said unsprung part to correspondingly adjust said fulcrum member in the direction of said load position, and means for opposing adjustment of said member by said piston with a force less than developed by said piston for biasing said fulcrum member toward said empty position.

17. In a variable load brake equipment for a vehicle having a sprung part and an unsprung part, a variable leverage fluid pressure valve device comprising a fulcrum member adjustable to empty and load positions and to positions therebetween, and means cooperable with said fulcrum member to vary the degree of brake application on said vehicle according to the position of said fulcrum member, adjusting means comprising a piston operable by fluid under pressure and means operable by said piston in accordance with the position of said sprung part with respect to said unsprung part to correspondingly adjust said fulcrum member in the direction of said load position, and a spring acting on said fulcrum member in opposition to pressure of fluid on said piston for biasing said fulcrum member in the direction of said empty position, the force of said spring being less than of said piston.

18. In a variable load brake equipment for a vehicle having a sprung part and an unsprung part, a variable leverage fluid pressure valve device comprising a fulcrum member adjustable to empty and load positions and to positions therebetween, and means cooperable with said fulcrum member to vary the degree of brake application on said vehicle according to the position of said fulcrum member, adjusting means comprising a piston operable by fluid under pressure and means operable by said piston in accordance with the position of said sprung part with respect to said unsprung part to correspondingly adjust said fulcrum member in the direction of said load position, means for opposing adjustment of said member by said piston with a force less than developed by said piston for biasing said fulcrum member toward said empty position, locking means for holding said member in an adjusted position, actuating means for rendering said locking means effective and ineffective, and means for controlling said actuating means operative upon rendering said locking means ineffective to effect a supply of fluid under pressure to actuate said piston, means operative upon operation of said actuating means to render said locking means effective to release fluid under pressure from said piston, and means for retarding the release of fluid under pressure from said piston.

19. In a variable load brake equipment for a vehicle having a sprung part and an unsprung part, a variable leverage fluid pressure valve device comprising a fulcrum member adjustable to empty and load positions and to positions therebetween, and means cooperable with said fulcrum member to vary the degree of brake application on said vehicle according to the position of said fulcrum member, adjusting means comprising a piston operable by fluid under pressure and means operable by said piston in accordance with the position of said sprung part with respect to said unsprung part to correspondingly adjust said fulcrum member in the direction of said load position, means for opposing adjustment of said member by said piston with a force less than developed by said piston for biasing said fulcrum member toward said empty position, locking means for holding said member in an adjusted position, a locking piston operable by fluid under pressure to render said locking means ineffective and upon release of fluid under pressure effective, a brake pipe, valve means controlled by fluid under pressure in said brake pipe operable with pressure of fluid in said brake pipe less than a chosen degree to supply fluid under pressure to actuate said locking piston and operable upon an increase in pressure in said brake pipe to a chosen higher degree to release fluid under pressure from said locking piston, means operable upon operation of said locking piston to a position for rendering said locking means ineffective to establish a communication for supplying fluid under pressure to said piston of said adjusting means, means operative to release fluid under pressure from the last named piston upon operation of said locking piston to render said locking means effective, and means for retarding the release of fluid under pressure from said piston of said adjusting means with respect to the release of fluid under pressure from said locking piston.

20. In a variable load brake equipment for a vehicle having a sprung part and an unsprung part, an adjustable brake limiting means adjustable to empty and load positions and therebetween, and means cooperable with said limiting means to vary the degree of brake application on said vehicle according to the position of said limiting means, adjusting means operable in accordance with the position of said sprung part with respect to said unsprung part to correspondingly adjust said limiting means, and means for biasing said limiting means against force of said adjusting means.

21. In a fluid pressure brake, in combination, a brake pipe, first and second brake cylinder pipes, valve means operable upon a reduction in pressure in said brake pipe to supply fluid under pressure to said first brake cylinder pipe and upon an increase in pressure of fluid in said brake pipe to release fluid under pressure from said first brake cylinder pipe, other valve means subject to a control pressure of fluid from said first brake cylinder pipe and opposing pressure of fluid in said second brake cylinder pipe operative to vary pressure of fluid in said second brake cylinder pipe in proportion to said control pressure in excess of a chosen degree of control pressure, and means determining said chosen excess of control pressure.

22. In a fluid pressure brake, in combination, a brake pipe, first and second brake cylinder pipes, valve means operable upon a reduction in pressure in said brake pipe to supply fluid under pressure to said first brake cylinder pipe and upon an increase in pressure of fluid in said brake pipe to release fluid under pressure from said first brake cylinder pipe, a relay comprising a lever, an adjustable fulcrum therefor, valve means controlled by said lever for controlling pressure of fluid in said second brake cylinder pipe, a first movable abutment connected to said lever subject to and operable by pressure of fluid in said first brake cylinder pipe to actuate said lever and valve means to supply fluid under pressure to said second brake cylinder pipe, and means including a second movable abutment connected to said lever and subject to pressure of fluid in said second brake cylinder pipe acting in opposition to pressure of fluid on said first movable abutment for actuating said lever and valve means to limit the pressure of fluid in said second brake cylinder pipe to a chosen degree less than in said first brake cylinder pipe regardless of the position of said fulcrum with respect to said lever.

23. In a fluid pressure brake, in combination, a brake pipe, first and second brake cylinder pipes, valve means operable upon a reduction in pressure in said brake pipe to supply fluid under pressure to said first brake cylinder pipe and upon an increase in pressure of fluid in said brake pipe to release fluid under pressure from said first brake cylinder pipe, a relay comprising a lever having a fulcrum, two movable abutments of equal areas subject respectively to pressure of fluid in said first and second brake cylinder pipes and connected to said lever in opposing relation, valve means controlled by said lever for varying pressure of fluid in said second brake cylinder pipe according to variations in pressure in said first brake cylinder pipe, and bias means opposing pressure of fluid on said first movable abutment with a chosen force for proportionately limiting the pressure of fluid in said second brake cylinder pipe to a degree less than in said first brake cylinder pipe.

24. In a fluid pressure brake, in combination, a brake pipe, first and second brake cylinder pipes, valve means operable upon a reduction in pressure in said brake pipe to supply fluid under pressure to said first brake cylinder pipe and upon an increase in pressure of fluid in said brake pipe to release fluid under pressure from said first brake cylinder pipe, a relay comprising a lever having a fulcrum, two movable abutments of equal areas subject respectively to pressure of fluid in said first and second brake cylinder pipes and connected to said lever in opposing relation, valve means controlled by said lever for varying pressure of fluid in said second brake cylinder pipe according to variations in pressure in said first brake cylinder pipe, and a spring opposing pressure of fluid on said first movable abutment with a chosen force for correspondingly limiting the pressure of fluid in said second brake cylinder pipe to a degree less than in said first brake cylinder pipe.

25. In a fluid pressure brake, in combination, a brake pipe, first and second brake cylinder pipes, valve means operable upon a reduction in pressure in said brake pipe to supply fluid under pressure to said first brake cylinder pipe and upon an increase in pressure of fluid in said brake pipe to release fluid under pressure from said first brake cylinder pipe, other valve means subject to a control pressure of fluid from said first brake cylinder pipe and opposing pressure of fluid in said second brake cylinder pipe operative to vary pressure of fluid in said second brake cylinder pipe in proportion to said control pressure in excess of a chosen degree of control pressure, means determining said chosen excess of control pressure, and means interposed between said first brake cylinder pipe and said other valve means for limiting the degree of said control pressure of fluid to less than the pressure of fluid in said first brake cylinder pipe.

EARLE S. COOK.

REFERENCES CITED

The following references are of record in the file of this patent:

UNITED STATES PATENTS

| Number | Name | Date |
|---|---|---|
| 863,849 | Herr | Aug. 20, 1907 |
| 1,650,309 | Whitaker | Nov. 22, 1927 |
| 1,801,908 | Down | Apr. 21, 1931 |
| 800,358 | Chapsal et al. | Sept. 26, 1905 |
| 1,505,540 | Bulbick | Aug. 19, 1924 |
| 2,178,927 | Campbell | Nov. 7, 1939 |